Patented Mar. 15, 1949

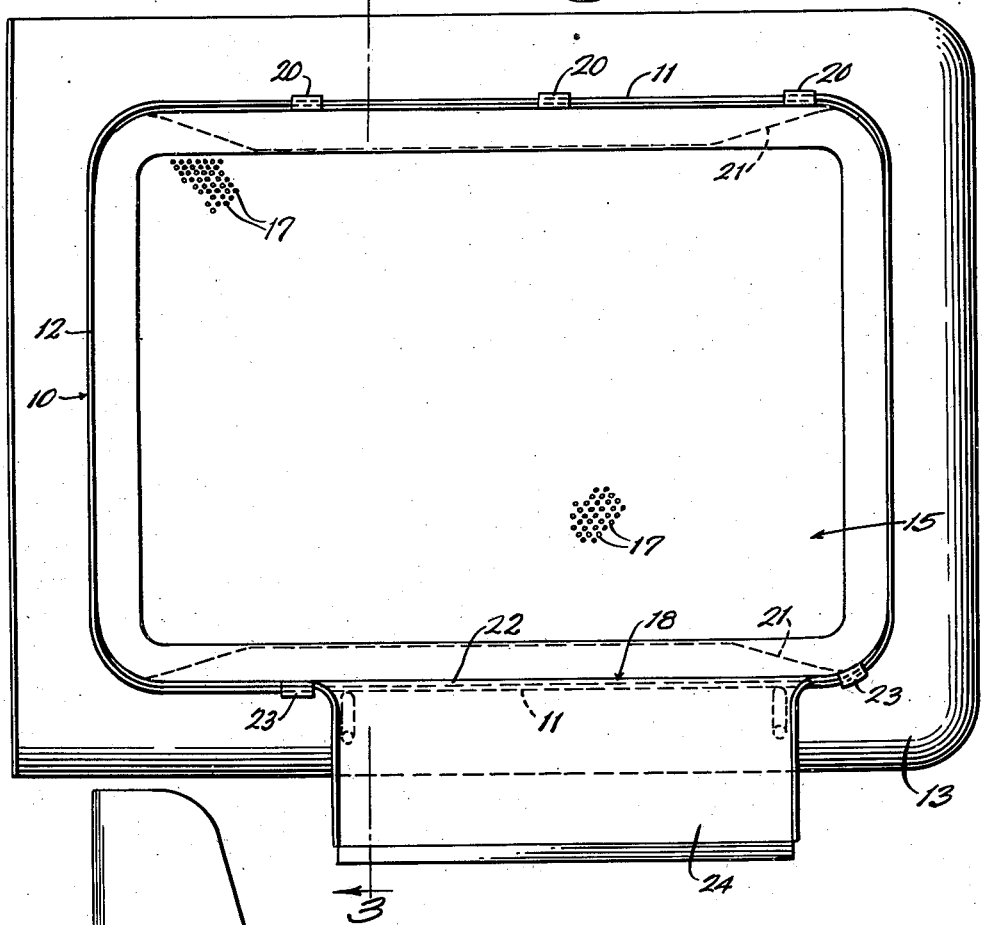
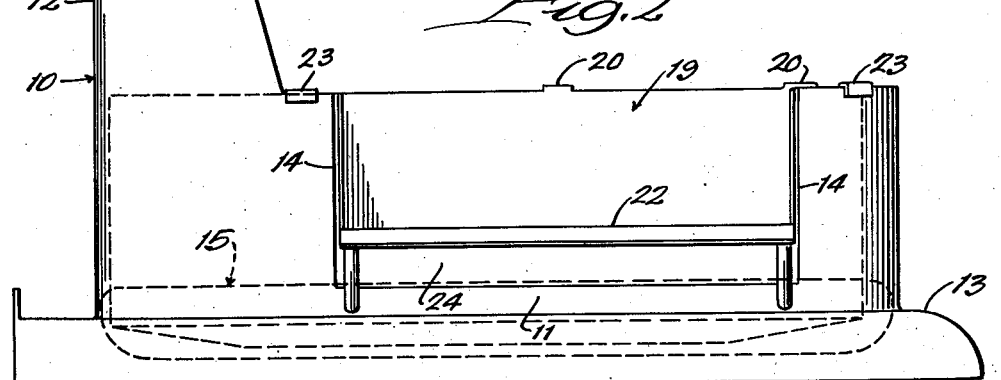

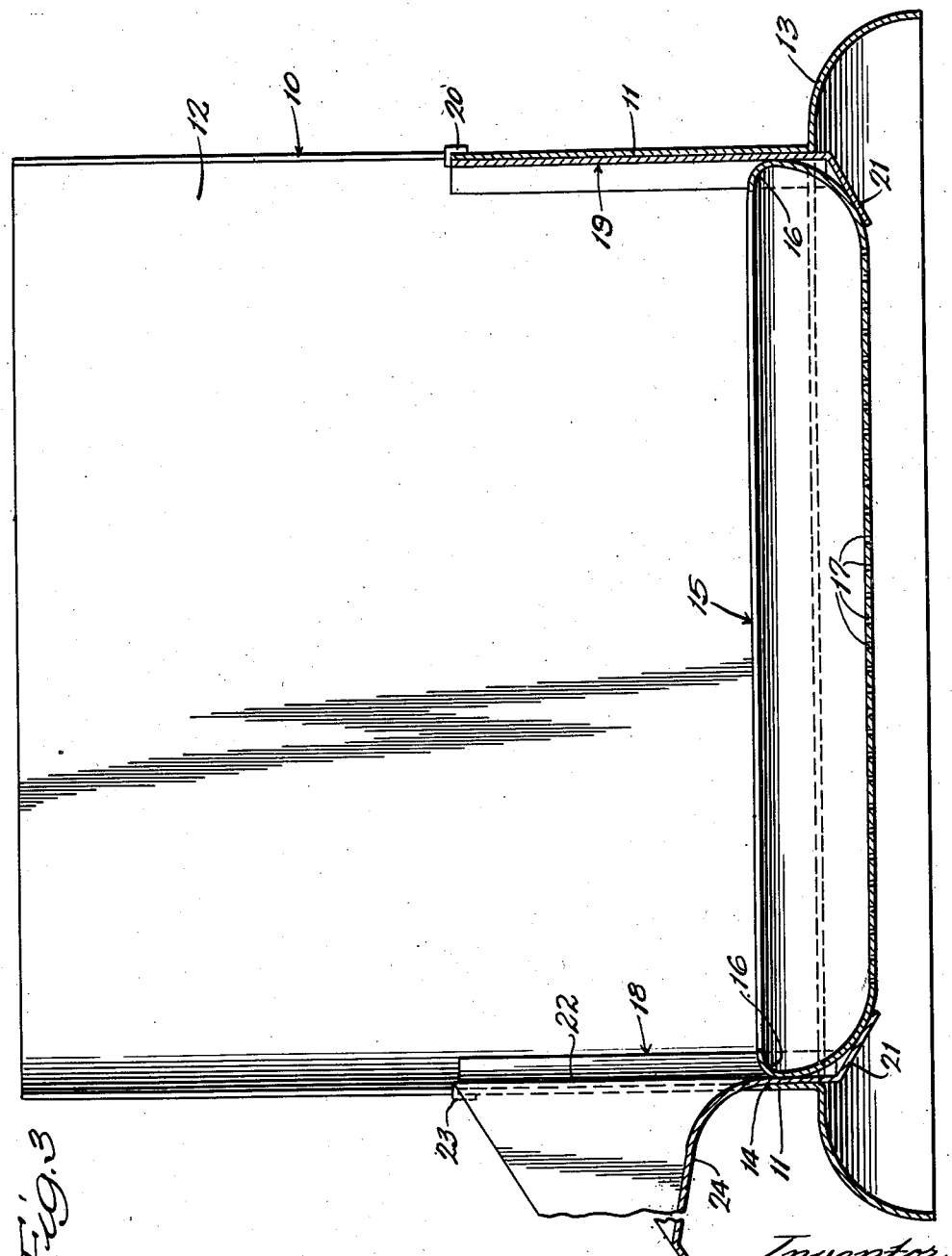

2,464,531

UNITED STATES PATENT OFFICE 2,464,531

DUMP CAN

Vergil Schwarzkopf, La Grange, Ill., assignor to The Lathrop-Paulson Company, Chicago, Ill., a corporation of Illinois Application June 21, 1947, Serial No. 756,302

4 Claims. (Cl. 210—155)

1

This invention relates to a dump can structure, and is particularly useful in connection with a dump can employed in connection with weigh cans for receiving milk, etc.

In order to prevent milk from splashing out of a dump can or escaping through parts connecting the same with a weigh can, it has heretofore been necessary to weld together several strips of metal to provide a structure for receiving a strainer, while at the same time providing an apron which will prevent the splashing of milk outside of the structures. The resulting dump can structure is extremely expensive and often faulty because of the hand work required in the welding operations.

An object of the present invention is to provide an extremely simple structure which may be produced without welding a separate flange to the structure, while at the same time effectively supporting the strainer and providing a demountable support that may be subjected to separate cleaning operations. Yet, another object is to provide a novel dump can providing means for supporting a strainer and for deflecting any liquid escaping thereabout into the weigh can. Yet, another object is to provide a dump can structure of simple and unitary structure equipped with removable means for supporting a strainer and for deflecting any liquid escaping thereabout into the weigh can. Other specific objects and advantages will appear as the specification proceeds.

The invention is illustrated, in a single embodiment, by the accompanying drawings, in which—

Figure 1 is a top plan view of a dump can structure embodying my invention; Fig. 2, a side view in elevation; and Fig. 3, a transverse sectional view, the section being taken as indicated at line 3 of Fig. 1.

In the illustration given, 10 designates a casing which provides a rectangular milk-receiving vessel 11 equipped at one end with an integral upwardly-extending baffle 12. The casing 10 is provided below the central milk-receiving portion 11, with an outwardly flared skirt 13. The skirt 13 is adapted to be received by a weigh can into which the milk is discharged. One side of the vessel portion 11 is cut away at 14 for a purpose which will be hereinafter set out.

Within the casing 10 and preferably at the lower portion of vessel 11, I provide a strainer vessel 15 having upwardly and inwardly turned side walls 16 and a perforated bottom wall 17.

In order to support the strainer 15 within the relatively smooth interior provided by the casing

2

10, I provide a deflector structure 18. The structure 18 comprises at least a pair of side wall members which are releasably carried by the top edge of the casing walls 11. In the illustration given, the member 19 is provided at its top with three U-shaped straps 20, which hook over the top edge of the wall 11. The member 19 is provided at its bottom with an inwardly turned deflector flange 21. Similarly, on the opposite side is a member 22 having U-shaped straps 23 extending over the edges of the upwardly-extending wall 11 so as to support the member 22 thereon. The member 22, however, is provided with a laterally-extending central portion 24 providing a drain for receiving milk which drips from the cans when the same are being transferred laterally to a can-washing machine.

The deflector structures 19 and 22 extend along the side walls 11 provided by the casing 10, and thus support at their bottom deflector flanges 21 which extend longitudinally of the casing frame 10. The inwardly turned deflector flanges provide a support for the strainer 15, while at the same time insuring that all milk which may escape from the strainer 15, is deflected inwardly into the weigh can below.

Operation

In the operation of the structure, the dump can provided by the casing 10 is placed upon a weigh can as in the usual operation, the weigh can being provided with scales for weighing the milk, and the parts are assembled as illustrated best in Fig. 3. In such assembly, the member 19 is placed in position with the hooks 20 engaging the upper edge of the vessel wall 11, while on the opposite side the member 22 is placed in position with the hooks 23 engaging the wall 11, as illustrated in Figs. 1 and 3. The member 22 provides a laterally-extending drain for receiving any milk falling from the mouth of the can as the can is passed laterally to the washing machine (not shown). The milk is dumped with the forward end of the milk can toward the raised portion 12 of the dump can and the milk is poured into the strainer 15. The upwardly and inwardly inclined walls 16 of the strainer tend to prevent milk from splashing outwardly and upwardly, and the mass of the milk passes through the strainer 15 into the weigh can below. Should, however, any milk fail to enter the strainer 15, and should it accumulate on the outer surfaces of the strainer 15, such milk is deflected inwardly by the flanges 21 so that it is all received within the weigh can.

For cleaning, the assembly can be removed in an instant, the strainer 15 being lifted out and the side members 19 and 22 being lifted away from the walls 11 of the receiving vessel.

In the operations described, the deflector structures 19 and 22 serve the double function of providing a support for the strainer 15 and for deflecting any material from the strainer 15 into the weigh can. If desired, the deflector members 19 and 22 may be supported so that the flanges 21 extend above the strainer 15, the strainer 15 being supported by integral lugs carried on the inside of walls 11. In either position, the deflectors 21 serve to bring the liquid centrally within the structure so as to insure its reaching the weigh can.

In the new structure, the entire casing can be formed from a single sheet, with only the points of junction being welded together, and the lower portion of the sheet being spread laterally to form the skirt 13. It is unnecessary to weld the skirt or other perimetric member to the casing. A much less expensive structure is thus provided, while at the same time the functions of supporting the strainer 15 and of deflecting all of the milk passing around it into the weigh can are successfully discharged. In addition, the supporting members are readily releasable for washing and thorough cleaning.

In the foregoing structure, it will be noted that the deflector side wall member 22 not only serves as a means for supporting one side of strainer 15 and providing a deflector wall 21, but also it furnishes the laterally-extending drain wall which permits the can to be moved rapidly from the dump can and in a lateral direction to the can-washing machine.

While in the foregoing specification, I have set forth one embodiment of the structure in considerable detail for the purpose of illustrating the invention, it will be understood that such details may be varied widely by those skilled in the art without departing from the spirit of my invention.

I claim:

1. In a dump can, a casing providing a milk-receiving vessel and a skirt depending from said vessel, a plurality of deflector members having inwardly turned flanges at their lower ends and having hooks at their upper ends for engaging the top edges of the side walls of said vessel, and a strainer supported by the flanges of said deflectors, at least one of said deflector members being provided with a laterally-extending drain wall for returning milk draining from a can to said dump can.

2. In a dump can, a casing providing a liquid-receiving vessel and a skirt depending from said vessel, deflector means supported upon the side walls of said vessel and having an inwardly turned flange, a strainer supported by the flange of said deflector means, said deflector means being provided with a laterally extending drain wall for returning liquid draining from a can to said dump can.

3. In a dump can, a casing providing a liquid-receiving vessel and a skirt depending from said vessel, a plurality of deflector members having inwardly turned flanges at their lower ends and being supported upon the said walls of said vessel, and a strainer carried by the flanges of said deflectors, at least one of said deflector members being provided with a laterally extending drain wall for returning liquid draining from a can to said dump can.

4. In a dump can, a casing providing a milk-receiving vessel and a skirt depending from said vessel, a plurality of deflector members having inwardly turned flanges at their lower ends and having hooks at their upper ends for engaging the top edges of the side walls of said vessel, said vessel being cut away along one side, and at least one of said deflector members having a laterally and upwardly inclined drain wall extending through said vessel opening and equipped with side walls for channeling milk draining from a can to said dump can.

VERGIL SCHWARZKOPF.

REFERENCES CITED

The following references are of record in the file of this patent:

UNITED STATES PATENTS

| Number | Name | Date |
|---|---|---|
| 626,170 | Lagerquist | May 30, 1899 |
| 631,460 | Evans | Aug. 22, 1899 |
| 1,313,992 | James | Aug. 26, 1919 |
| 1,466,920 | Anderson | Sept. 4, 1923 |
| 2,059,003 | Lathrop | Oct. 27, 1936 |
| 2,413,742 | Carkhuff | Jan. 7, 1947 |

FOREIGN PATENTS

| Number | Country | Date |
|---|---|---|
| 20,087 | Switzerland | June 25, 1900 |
| 360,486 | France | Feb. 24, 1906 |